(No Model.) 2 Sheets—Sheet 1.

M. McDOWELL.
WHEEL FOR VEHICLES.

No. 265,124. Patented Sept. 26, 1882.

Witnesses
W. C. Calies
Jno. C. MacGregor

Inventor
Malcolm McDowell
By Coburn & Thacher
Attorneys

N. PETERS, Photo-Lithographer, Washington, D. C.

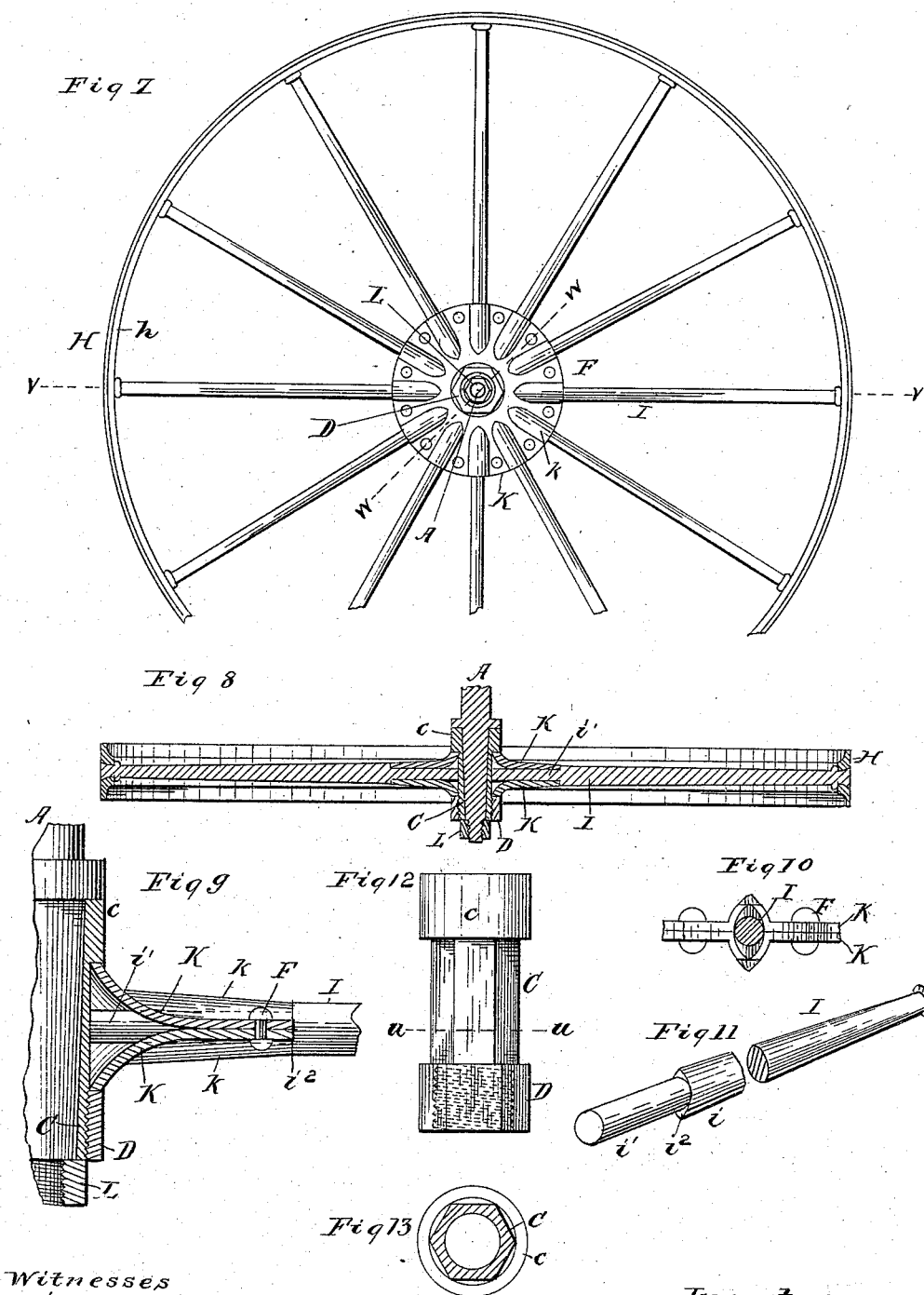

UNITED STATES PATENT OFFICE.

MALCOLM McDOWELL, OF CHICAGO, ILLINOIS, ASSIGNOR OF ONE-FOURTH TO WALTER G. COOLIDGE, OF SAME PLACE.

WHEEL FOR VEHICLES.

SPECIFICATION forming part of Letters Patent No. 265,124, dated September 26, 1882.

Application filed March 31, 1882. (No model.)

*To all whom it may concern:*

Be it known that I, MALCOLM MCDOWELL, a citizen of the United States, residing at Chicago, in the county of Cook and State of Illinois, have invented certain new and useful Improvements in Vehicle-Wheels, fully set forth in the following specification, reference being had to the accompanying drawings, in which—

Figure 1:
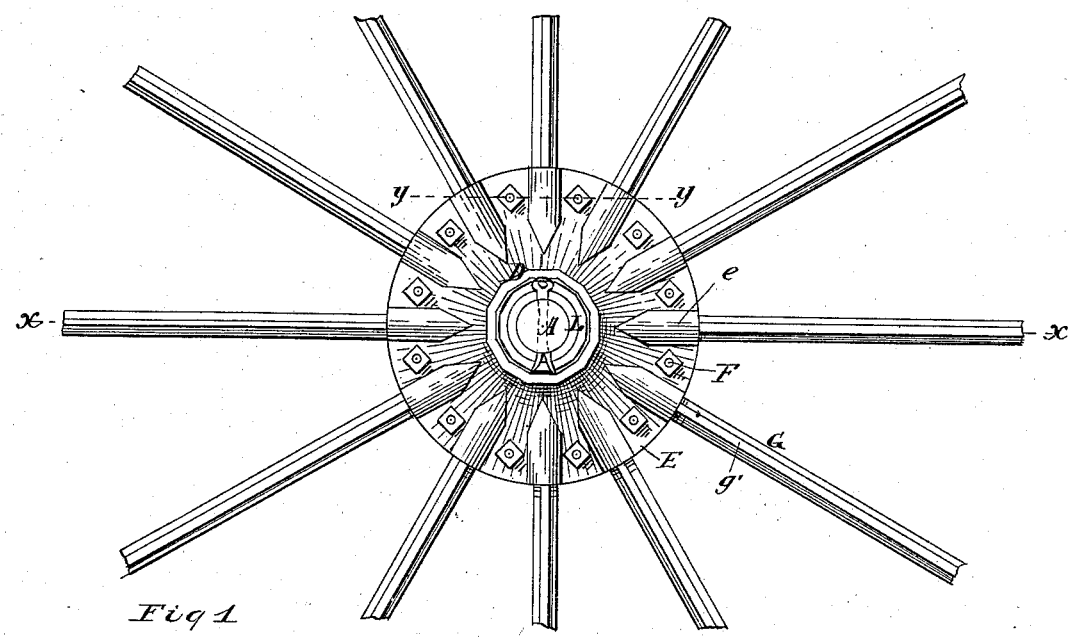
Figure 2:
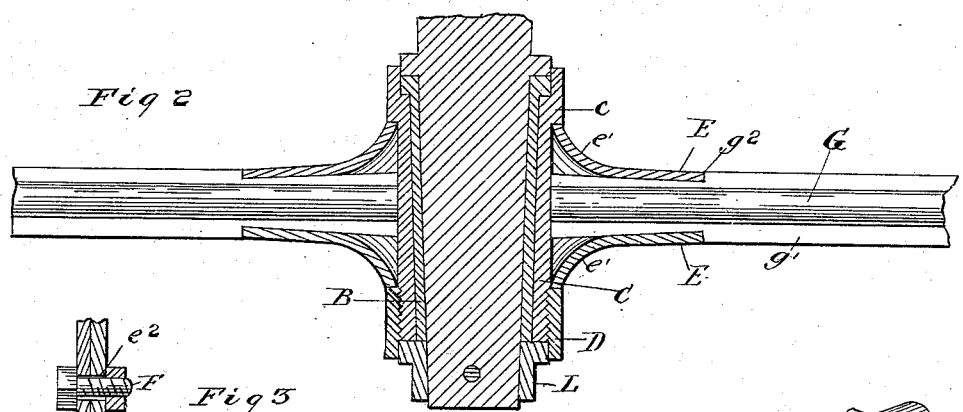
Figure 3:
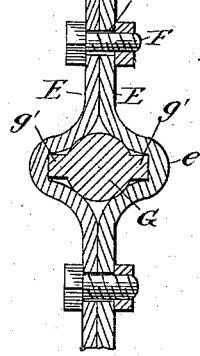
Figure 4:
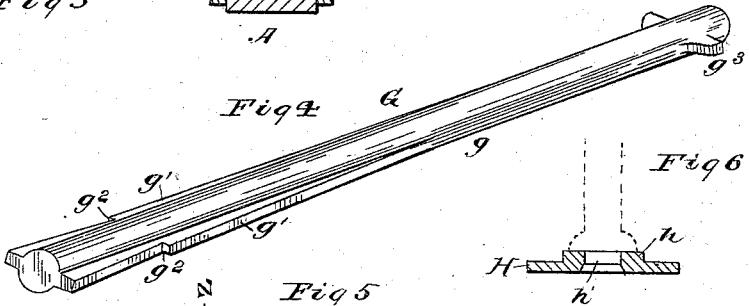
Figure 6:
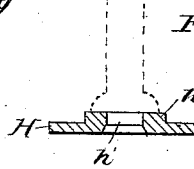
Figure 5:
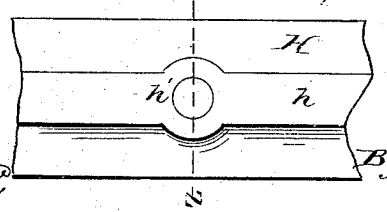

Figure 1 represents a side elevation of the hub and a portion of the spokes of a wheel embodying my improvements; Fig. 2, a section of the same, taken on the line $x\,x$, Fig. 1; Fig. 3, a detail section of the same, taken on the line $y\,y$, Fig. 1; Fig. 4, a perspective view of a single spoke detached; Fig. 5, a detail plan of a section of the felly; Fig. 6, a section of the same, taken on the line $z\,z$, Fig. 5, with the outer end of the spoke shown in dotted lines; Fig. 7, a side elevation of a similar wheel, showing some modifications in construction; Fig. 8, a section of the same, taken on the line $v\,v$, Fig. 7; Fig. 9, a detail section on an enlarged scale, taken on the line $w\,w$, Fig. 7; Fig. 10, a detail section across one spoke, showing its fastening at the hub; Fig. 11, a perspective view of one of the modified spokes, the central portion being broken away; Fig. 12, a plan of the axle-skein; and Fig. 13, a section of the same, taken on the line $u\,u$, Fig. 12.

My invention relates to wheels for vehicles, made entirely of metal, being adapted for use especially as the carrying-wheels for agricultural machines and other like purposes, though not restricted to this special use.

The invention consists in special features of construction applied to the different parts of the wheel, and I will proceed to describe fully the construction and application of these parts in practically carrying out my invention in one way, and will then point out definitely in the claims the improvements which I believe to be new and desire to secure by Letters Patent.

In the drawings, A represents the end of an axle of any ordinary construction, and in Figs. 1 and 2 of the drawings an ordinary axle-skein, B, is shown applied to the axle in the usual way. The hub of the wheel is made as follows: The hub proper, C, is of cast metal, with a cylindrical interior adapted to fit the axle-skein, but of polygonal form on its exterior, as shown in Fig. 12 of the drawings, the number of faces being made to correspond with the number of spokes in the wheel. At the inner end of this hub a shoulder, $c$, is provided, and preferably this end of the hub is made to extend inward over the end of the skein and collar on the axle, as shown in Fig. 2 of the drawings. The outer end of the hub is threaded, and a nut, D, is fitted to be turned on this end of the hub, projecting beyond the periphery of the latter, so that in place it makes another shoulder corresponding to the shoulder $c$. To complete the hub two disks, E, circularly formed, are struck up from metal plates, being corrugated respectively, the corrugations corresponding substantially in form to the respective halves of the spokes, (which will be described presently,) so that when the disks are fastened together the corrugations will constitute sockets within which the spokes are received and firmly held. One form of these corrugations is shown at $e$, in Figs. 1 and 3 of the drawings, the exterior being shown in the first, and both exterior and interior in the skein illustrated in Fig. 3. These metal disks are cut out centrally, so that they fit the cast portion C of the hub, and are bent outward or flared at their inner edges, as shown at $e'$ in the drawings, these flaring edges being adapted to abut against the shoulder $c$ and the nut D, respectively, when in place. The disks are also perforated, the holes $e^2$ being arranged near their outer edges between the corrugations, and are adapted to receive fastening rivets or screw-bolts F, by means of which the two disks are firmly secured together. When the disks are thus fastened together, slipped upon the center piece, C, and the nut D turned up tightly against the outer one, it is obvious that a complete metal hub is formed with sockets for the reception of the spokes. These latter I prefer to make of the form represented by G in Fig. 4 of the drawings, in which the central or main body, $g$, of the spoke is round, and at its inner end is provided on each side with wings or flanges $g'$, which give greater transverse strength to the hub end of the spoke. These wings are tapering from the inner end of the spoke outward until they finally vanish some distance from the outer end of the spoke. They are also notched transversely, as at $g^2$, these notches being made at a distance from the inner end of the spoke equal to the width of the disk portion of the hub. The extreme outer ends of the spokes are round, and are provided with short lugs or shoulders $g^3$ on opposite sides a short distance from the extremities. The corrugations in the hub-disks are of such shape as to make a socket substantially fitting this winged spoke, as shown in Fig. 3 of the drawings, though it is not necessary that the metal of the disks should closely follow the contour of the spokes, so as to touch all points. When the spokes are inserted in these sockets their inner ends strike against the central casting, resting on its respective flat faces, while the shoulders of the wings made by the notches $g^2$ rest upon the rims of the disks, as shown in Fig. 2 of the drawings, and the spokes will be held firmly in place, as is evident from the relation of the parts shown in Fig. 3 of the drawings. The tire or felly H is of rolled steel or iron, and is provided with a central web, $h$, on its inner side, somewhat narrower than the width of a tire, for the purpose of strengthening it and taking the place of the ordinary felly. This tire is rolled in bars of the shape described, cut into suitable lengths, and punched to form holes $h'$ at suitable distances and size to receive the round ends of the spokes. These holes are slightly conical or flaring outward, so that the ends of the spokes may be readily riveted to the tire. Instead of securing-bolts, rivets may be used for fastening the hub-plates together.

In Figs. 7 to 13 I have shown a modification in the construction of some parts of the wheel. It relates, however, mainly to the form of the spokes and the corresponding form of the embracing-sockets in the hub-plates. In this instance the spoke I has its main body $i$ oval, gradually tapering and vanishing, however, to a cylindrical form at the outer end. The inner end, $i'$, which is embraced by the hub-plates, is, however, made cylindrical, shoulders $i^2$ being thus formed by the edges of the oval resting on the rims of the hub-plates. The hub-plates K are provided with corrugations $k$, cylindrical in form, thus adapting them to embrace and hold the cylindrical inner ends of the spokes, as already described. In these figures, also, there is no skein shown, but the polygonal box or central portion of the hub is placed directly upon the axle. Obviously, however, this arrangement is optional, as a skein may be used with either form of wheel, if desired. In other respects the wheel shown in the drawings mentioned above is substantially the same as the one first described. In both instances the spokes are rolled in long rods, and are then cut to the required length and afterward notched and shouldered, as described, and in the winged spokes the surplus of the wings sheared off. The hub-plates are cut from wide flat bars rolled for the purpose, and are sheared into disk form, then crimped or corrugated and punched by any suitable mechanism.

In setting up my wheel the tire is first bent into hoop shape and welded, the spokes are then inserted in the tire and riveted thereto, the shoulders at the outer end standing transversely to and resting against the central web of the tire. Their inner or hub ends are then brought together between the corrugated plates, and these latter are riveted or bolted together between the spokes. The box or central portion of the hub having first been inserted, the fastening-nut D is then turned on the box, thereby fastening the plates and spokes in place, as already described. When placed upon the axle the wheel is held in place in the usual manner by a nut, L, on the end of the axle.

In some particulars the construction of the several parts above described may be modified without departing from the gist of my improvements.

Having thus described my invention, what I claim as new, and desire to secure by Letters Patent, is—

1. In a metallic wheel, the cast central hub-box, shouldered as described, and having a polygonal surface, in combination with corrugated wrought-metal disk-rings bent or flared outward at their inner edges, and provided with central polygonal openings corresponding to the hub-box, and the fastening-nut on the end of the hub-box, substantially as described.

2. The wrought-metal hub-plates corrugated, as described, to form sockets for the spokes when fastened together, substantially as set forth.

3. The cast central hub-box, having a polygonal surface, in combination with the wrought-metal plates corrugated to form sockets when fastened together and metal spokes inserted in the sockets formed by the two plates and extending inward, with their inner ends resting on the flat surfaces of the polygonal hub-box, substantially as and for the purposes set forth.

4. The metal spokes G, provided with tapering side wings, $g'$, notched at $g^2$, as specified, substantially as and for the purpose set forth.

5. The wrought-metal hub-plates E, provided with corrugations $e$, corresponding to the size of the spokes, in combination with the spokes G, provided with side ribs, $g'$, notched at $g^2$ to form shoulders, and fastening bolts or rivets F, substantially as described.

6. The polygonal hub-box C, in combination with the wrought-metal hub-plates E, corrugated to form spoke-sockets when fastened together on the box, and the metal spokes G, provided with side ribs, $g'$, having notches $g^2$, against which the upper edges of the plates abut, substantially as described.

7. The wrought-metal tire H, provided with a central web, $h$, of less width than the tire, and openings $h'$, passing through the web, in combination with the wrought-metal spokes G, the upper ends of which are inserted in the openings $h'$ and headed down, and are provided with lateral projections or shoulders $g^3$, which abut against the web of the tire when the spokes are secured thereto, substantially as described.

MALCOLM McDOWELL.

Witnesses:
GEO. R. CUTLER,
W. C. CORLIES.